US010923011B2

(12) United States Patent
Wu et al.

(10) Patent No.: US 10,923,011 B2
(45) Date of Patent: Feb. 16, 2021

(54) BISTABLE DISPLAY DEVICE AND DRIVING CIRCUIT

(71) Applicants: Tzu-Yi Wu, Kaohsiung (TW); Ming-Hsun Sung, Hsinchu County (TW)

(72) Inventors: Tzu-Yi Wu, Kaohsiung (TW); Ming-Hsun Sung, Hsinchu County (TW)

(73) Assignee: ITE Tech. Inc., Hsinchu (TW)

( * ) Notice: Subject to any disclaimer, the term of this patent is extended or adjusted under 35 U.S.C. 154(b) by 0 days.

(21) Appl. No.: 16/661,992

(22) Filed: Oct. 23, 2019

(65) Prior Publication Data

US 2020/0410915 A1 Dec. 31, 2020

(30) Foreign Application Priority Data

Jun. 25, 2019 (TW) ............................ 108122109 A

(51) Int. Cl.

*G06F 3/038* (2013.01)
*G09G 5/00* (2006.01)
*G09G 5/10* (2006.01)
*G09G 3/20* (2006.01)

(52) U.S. Cl.

CPC ....... *G09G 3/20* (2013.01); *G09G 2310/0264* (2013.01); *G09G 2310/04* (2013.01); *G09G 2310/08* (2013.01); *G09G 2320/0252* (2013.01); *G09G 2360/12* (2013.01); *G09G 2360/18* (2013.01)

(58) Field of Classification Search

CPC ..... G09G 2360/18; G09G 5/363; G09G 5/393
See application file for complete search history.

(56) References Cited

U.S. PATENT DOCUMENTS 5,691,745 A * 11/1997 Mital .................... G09G 5/395 345/536
2009/0256868 A1* 10/2009 Low ..................... G06F 3/0481 345/691

FOREIGN PATENT DOCUMENTS

CN 101986380 3/2011
CN 101986380 A * 3/2011
CN 101996565 3/2011
(Continued)

OTHER PUBLICATIONS

"Office Action of Taiwan Counterpart Application", dated Feb. 18, 2020, p. 1-p. 7.

*Primary Examiner* — Nan-Ying Yang
(74) *Attorney, Agent, or Firm* — JCIPRNET

(57) ABSTRACT

The disclosure provides a bistable display device and a driving circuit. The bistable display device includes a display panel and the above-described driving circuit, wherein the driving circuit includes a source driver, a first image buffer, a second image buffer, and a timing controller. The source driver is coupled to the display panel to drive the display panel according to a pixel signal. The timing controller is coupled to the first image buffer, the second image buffer, and the source driver. The timing controller alternately selects a first image signal temporarily stored in the first image buffer and a second image signal temporarily stored in the second image buffer as a current image signal and a previous image signal. The timing controller performs a look-up mechanism based on the current image signal and the previous image signal to generate the pixel signal.

9 Claims, 5 Drawing Sheets

(56) References Cited

FOREIGN PATENT DOCUMENTS

| | | |
|---|---|---|
| CN | 105895030 | 8/2016 |
| TW | I474303 | 2/2015 |

* cited by examiner

BISTABLE DISPLAY DEVICE AND DRIVING CIRCUIT

CROSS-REFERENCE TO RELATED APPLICATION

This application claims the priority benefit of Taiwan application serial no. 108122109, filed on Jun. 25, 2019. The entirety of the above-mentioned patent application is hereby incorporated by reference herein and made a part of this specification.

BACKGROUND

1. Technical Field

The disclosure generally relates to a display technology, in particular, to a bistable display device and a driving circuit.

2. Description of Related Art

In recent years, with the rapid development of display technologies, many electronic products in the daily life have been equipped with display devices. With the popularization of portable electronic products, a bistable display device has gradually gained market attention since it can keep an image without continuous power supply and has the advantages of light weight, thinness, durability, low power consumption and the like.

However, the bistable display device in the prior art needs to compare a gray-scale change between a current image and a previous image to select corresponding driving data during image updating. The existing bistable display device may copy pre-loaded pixel data to a specific buffer and allow a timing controller to read pixel data of the current image and the previous image from the specific buffer according to a fixed reading path. If the size of the display device is larger, the size of the pixel data will be larger. This data copying process may cause a display image updating delay, which makes the bistable display device spend relatively long time on page change, thus affecting the reading experience of a user. Therefore, there is a real need to provide a bistable display device with higher page change speed.

SUMMARY

Accordingly, the disclosure provides a bistable display device and a driving circuit, so as to greatly increase the image updating speed of the bistable display device.

The disclosure provides a bistable display device, including a display panel, a source driver, a first image buffer, a second image buffer and a timing controller. The source driver is coupled to the display panel to drive the display panel according to a pixel signal. The timing controller is coupled to the first image buffer, the second image buffer and the source driver. The timing controller alternately selects a first image signal temporarily stored in the first image buffer and a second image signal temporarily stored in the second image buffer as a current image signal and a previous image signal and performs a look-up mechanism according to the current image signal and the previous image signal to generate the pixel signal.

The disclosure provides a bistable display device, including a display panel, a source driver, a display image buffer, a first image buffer, a second image buffer and a timing controller. The source driver is coupled to the display panel to drive the display panel according to a pixel signal. The display image buffer is configured to temporarily store a previous image signal. The timing controller is coupled to the source driver, the first image buffer, the second image buffer and the display image buffer. A current image signal is temporarily stored in one of the first image buffer and the second image buffer in turn, and the timing controller reads the current image signal from the first image buffer or the second image buffer to perform a look-up mechanism according to the current image signal and the previous image signal to generate the pixel signal.

The disclosure provides a driving circuit, configured to drive a display panel, and including a source driver, a first image buffer, a second image buffer and a timing controller. The source driver is coupled to the display panel to drive the display panel according to a pixel signal. The timing controller is coupled to the first image buffer, the second image buffer and the source driver. The timing controller alternately selects a first image signal temporarily stored in the first image buffer and a second image signal temporarily stored in the second image buffer as a current image signal and a previous image signal, and performs a look-up mechanism according to the current image signal and the previous image signal to generate the pixel signal.

The disclosure provides a driving circuit, configured to drive a display panel, and including a source driver, a display image buffer, a first image buffer, a second image buffer and a timing controller. The source driver is coupled to the display panel to drive the display panel according to a pixel signal. The display image buffer is configured to temporarily store a previous image signal. The timing controller is coupled to the source driver, the first image buffer, the second image buffer and the display image buffer. A current image signal is temporarily stored in one of the first image buffer and the second image buffer in turn, and the timing controller reads the current image signal from the first image buffer or the second image buffer to perform a look-up mechanism according to the current image signal and the previous image signal to generate the pixel signal.

Based on the above, the bistable display device and the driving circuit of the embodiments of the disclosure do not need to copy the image signals temporarily pre-stored in other buffers to another buffer configured to output the current image signal, so that the disclosure can omit the time-consuming image signal copying action, especially when a display region is larger, the delay caused by the image signal copying action is more obvious. After the image buffer of the disclosure receives the current image signal, the timing controller can directly read the current image signal from the image buffer, and further can increase the display image updating speed by reading the data of different image buffers in turn. Therefore, according to the bistable display device and the driving circuit of the embodiments of the disclosure, the display image updating delay may be reduced, and the image updating speed of the bistable display device may be greatly increased.

In order to make the aforementioned and other objectives and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
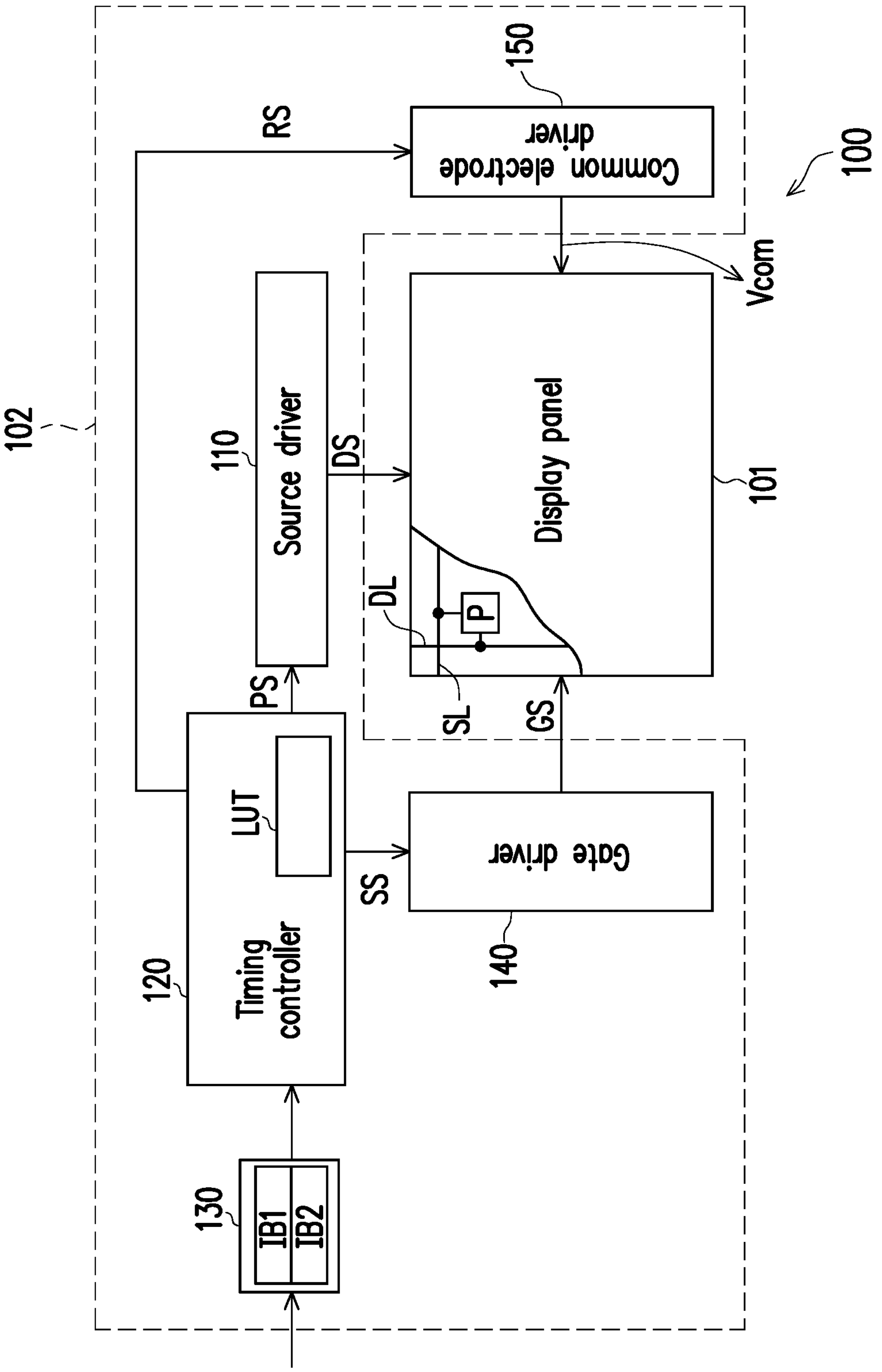
FIG. 1 is a structural diagram of a bistable display device according to an embodiment of the disclosure.

FIG. 1 is a structural diagram of a bistable display device according to an embodiment of the disclosure. Referring to FIG. 1, a bistable display device 100 includes a display panel 101 and a driving circuit 102. The driving circuit 102 is configured to drive the display panel 101 to display images to a user for watching. The display panel 101 includes a plurality of scanning lines SL, a plurality of data lines DL and a plurality of pixels P (FIG. 1 only shows one scanning line SL, one data line DL and one pixel P as a representative). These pixels P are arrayed and respectively coupled to the scanning lines SL and the data lines DL. In the following descriptions, the display panel 101 takes an e-paper display (EPD) as an embodiment, but not limited thereto. The display panel 101 also may be other types of bistable display panels, such as an electronic ink (E-ink) display panel, an electrowetting display (EWD) panel, a quick response-liquid powder display (QR-LPD) panel or a cholesteric liquid crystal display (ChLCD) panel.

The driving circuit 102 at least includes a source driver 110, a timing controller (T-con) 120 and a buffer apparatus 130. The timing controller 120 is coupled to the source driver 110 and the buffer apparatus 130. The buffer apparatus 130 at least includes two buffers, such as a first image buffer IB1 and a second image buffer IB2 in FIG. 1, but the disclosure does not limit the number of buffers.

The first image buffer IB1 and the second image buffer IB2 are configured to respectively temporarily store image signals of different timings, such as an image signal (hereinafter referred to as the previous image signal) currently displayed by the display panel 101 and an image signal (hereinafter referred to as the current image signal) to be displayed at present by the display panel 101. The timing controller 120 is coupled to the first image buffer IB1 and the second image buffer IB2. The timing controller 120 alternately selects a first image signal temporarily stored in the first image buffer IB1 and a second image signal temporarily stored in the second image buffer IB2 as the current image signal and the previous image signal, and performs a look-up mechanism according to the current image signal and the previous image signal to generate a pixel signal PS. The pixel signal PS may be transmitted to the source driver 110.

In the present embodiment, the timing controller 120 may have a built-in look-up table LUT to perform the look-up mechanism. The look-up table LUT records driving waveforms required for gray-scale conversion of each pixel P. However, in other embodiments, the timing controller 120 also may perform the look-up mechanism through a look-up table stored in an external memory (not shown).

It should be further noted that the timing controller 120 reads the current image signal from the first image buffer IB1 and the second image buffer IB2 in turn, that is, the reading path for the current image signal or the previous image signal of the present embodiment is not specified.

In addition, the driving circuit 102 further includes a gate driver 140 and a common electrode driver 150. The timing controller 120 is also coupled to the gate driver 140 and the common electrode driver 150. The gate driver 140 generates a gate signal GS according to a scanning enable signal SS provided by the timing controller 120, thereby turning on each column of pixels in the display panel 101 one by one. The common electrode driver 150 generates a plurality of common voltages Vcom to a common electrode of the display panel 101 according to a reference signal RS provided by the timing controller 120. The source driver 110 generates a display voltage signal DS according to the pixel signal PS provided by the timing controller 120, thereby driving each pixel P to display an image according to a voltage difference between the corresponding display voltage signal DS and each of the common voltages Vcom.

Implementation details of the bistable display device 100 are further described below.

Figure 2:
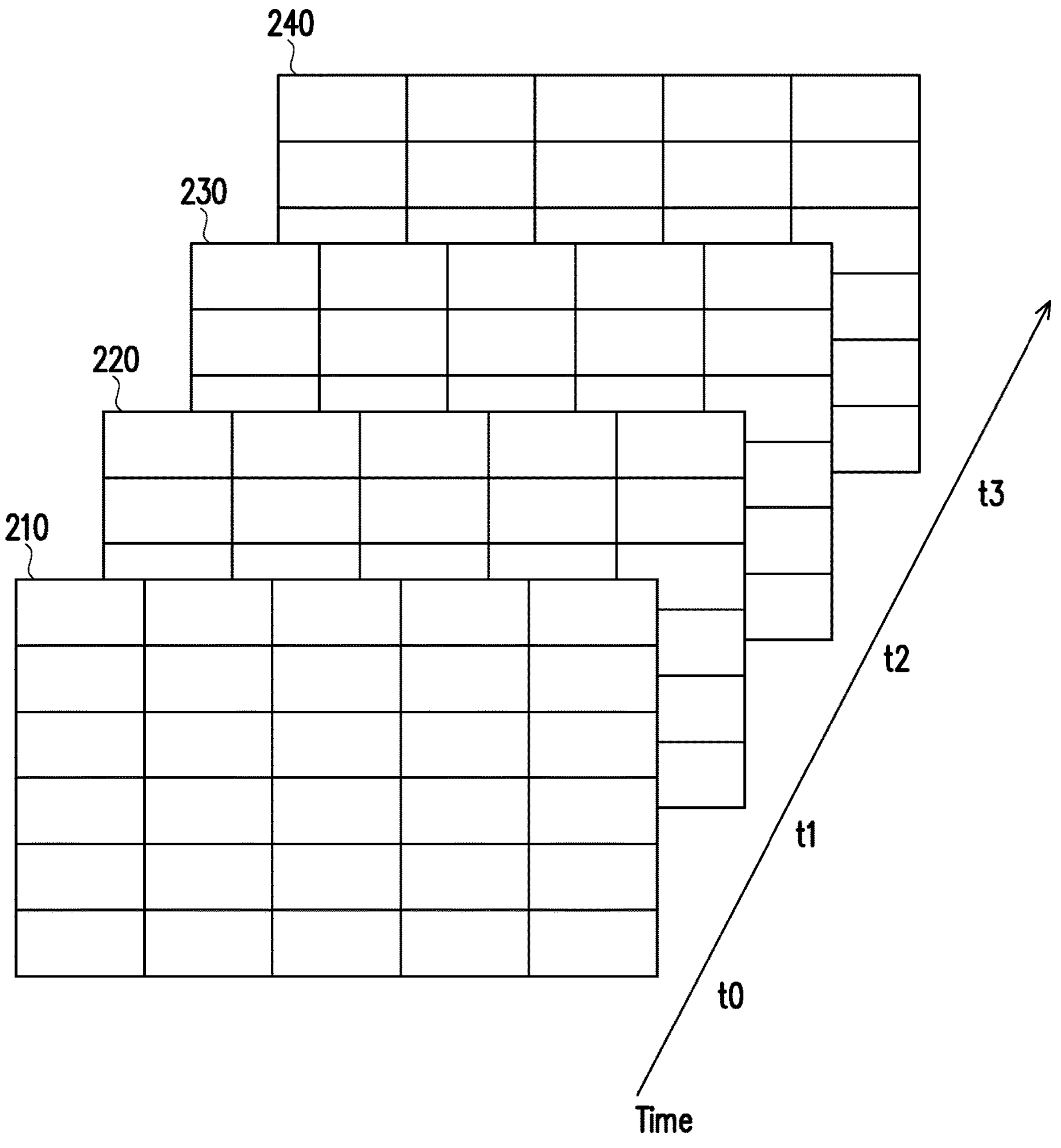
FIG. 2 is a schematic diagram of an image signal at different timings according to an embodiment of the disclosure.

FIG. 2 is a schematic diagram of an image signal at different timings according to an embodiment of the disclosure. In FIG. 2, the bistable display device 100 may display an image signal 210 at a first timing t0, an image signal 220 at a second timing t1, an image signal 230 at a third timing t2, and an image signal 240 at a fourth timing t3. The first timing t0 to the fourth timing t3 are respectively in a time order. The first timing t0, the second timing t1, the third timing t2 and the fourth timing t3 in the present description refer to time points at which the display panel 101 reaches a steady state.

Figure 3:
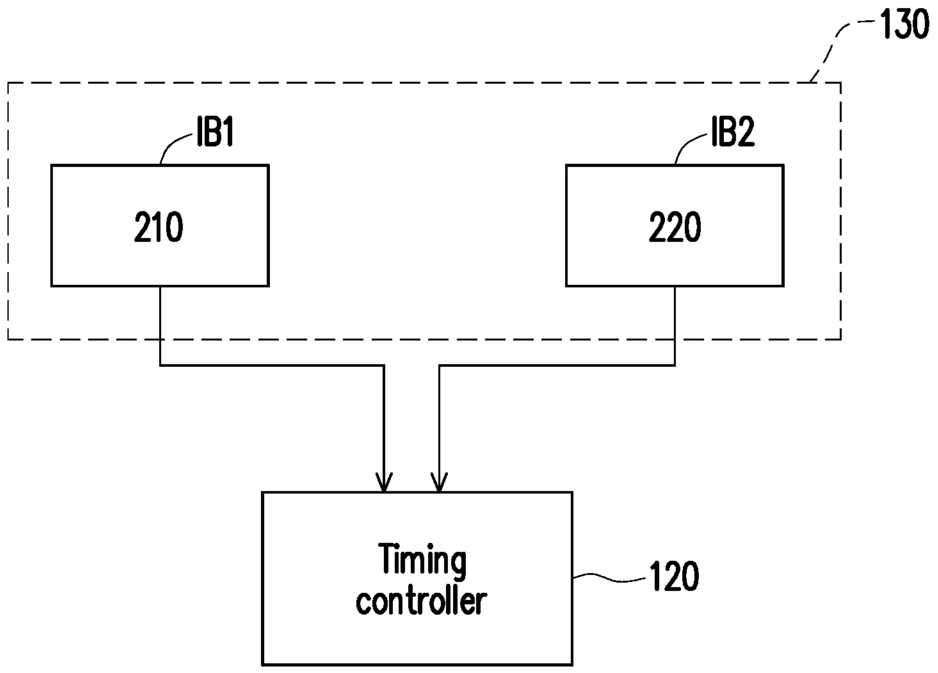
FIG. 3 and FIG. 4 are schematic diagrams showing that a timing controller reads image signals from a buffer apparatus at different timings according to an embodiment of the disclosure.
Figure 4:
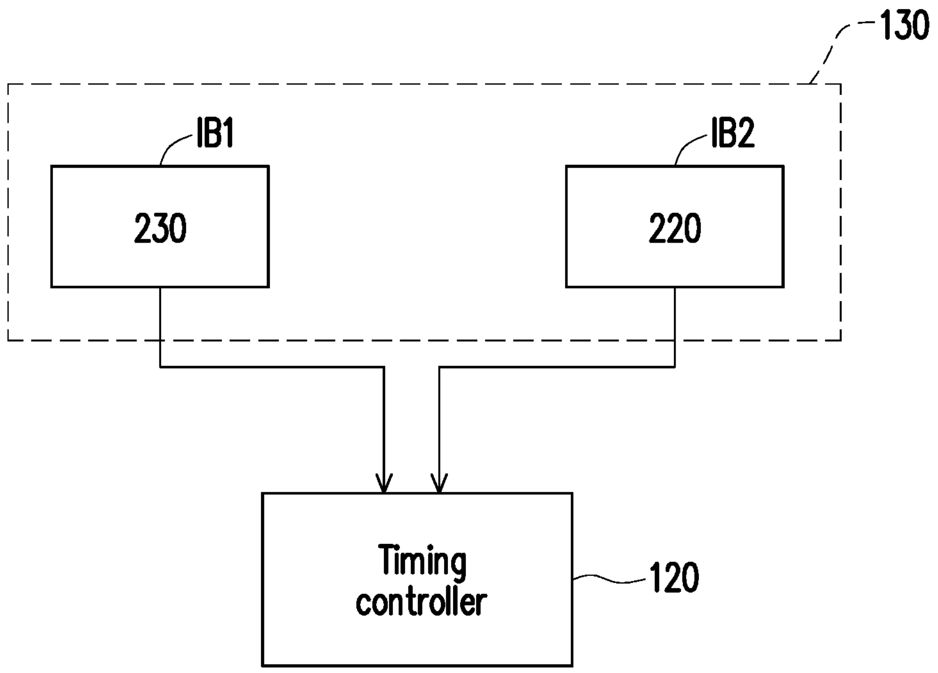

FIG. 3 and FIG. 4 are schematic diagrams showing that a timing controller reads image signals from a buffer apparatus at different timings according to an embodiment of the disclosure. Referring to FIG. 3 and FIG. 4 in combination with FIG. 2, in FIG. 3, the bistable display device 100 displays the image signal 210 at the first timing t0 and intends to display the image signal 220 at the next timing (the second timing t1).

At present, the first image buffer IB1 stores the displayed image signal 210, and the image signal 220 to be displayed is pre-loaded into the second image buffer IB2. The timing controller 120 reads the image signal 210 and the image signal 220 from the first image buffer IB1 and the second image buffer IB2 respectively, and determines that the image signal 210 is the previous image signal and the image signal 220 is the current image signal. Then, the timing controller 120 performs look-up on the look-up table LUT according to the current image signal (the image signal 220) and the previous image signal (the image signal 210) to generate a pixel signal PS to drive the display panel 101 to display the image signal 220 at the second timing t1.

Then, in FIG. 4, the bistable display device 100 is to display the image signal 230 at the third timing t2, so the image signal 230 is temporarily stored in the first image buffer IB1, and the second image buffer IB2 continues to maintain the image signal 220. The timing controller 120 reads the image signal 230 and the image signal 220 from the first image buffer IB1 and the second image buffer IB2 respectively, and determines that the image signal 220 is the previous image signal and the image signal 230 is the current image signal. The timing controller 120 performs look-up on the look-up table LUT according to the current image signal (the image signal 230) and the previous image signal (the image signal 220) to generate a pixel signal PS to drive the display panel 101 to display the image signal 230 at the third timing t2.

If the bistable display device 100 further needs to continuously display a new image at the next timing (e.g., the fourth timing t3), the second image buffer IB2 temporarily stores the next image signal 240 instead, while the first image buffer IB1 continues to maintain the image signal 230. By parity of reasoning, if the bistable display device 100 has no images to be updated, the second image buffer IB2 may be in an idle state, while the first image buffer IB1 continues to maintain the image signal 230.

It is worth mentioning that data characters stored in the first image buffer IB1 and the second image buffer IB2 are exchanged in turn, and when the next image signal to be displayed is loaded into the buffer apparatus 130, it may be alternately selected to be temporarily stored in the first image buffer IB1 or the second image buffer IB2. Compared with the prior art that the current image signal needs to be copied to a specific storage location, or the current image signal is copied to another specific storage location serving as an updated previous image signal after an image is updated, by receiving the current image signal in turn and receiving the buffer temporary data of the current image signal to serve as previous image data at the next timing, the driving circuit 102 of the present embodiment may omit the above data copying step to achieve an effect of increasing the image updating speed of the bistable display device 100.

For example, the page updating time of an existing bistable display device generally exceeds several milliseconds, but the page updating time of the bistable display device 100 of the present embodiment may be less than 1 millisecond, and thus has the effect of significantly increasing the image updating speed.

Figure 5:
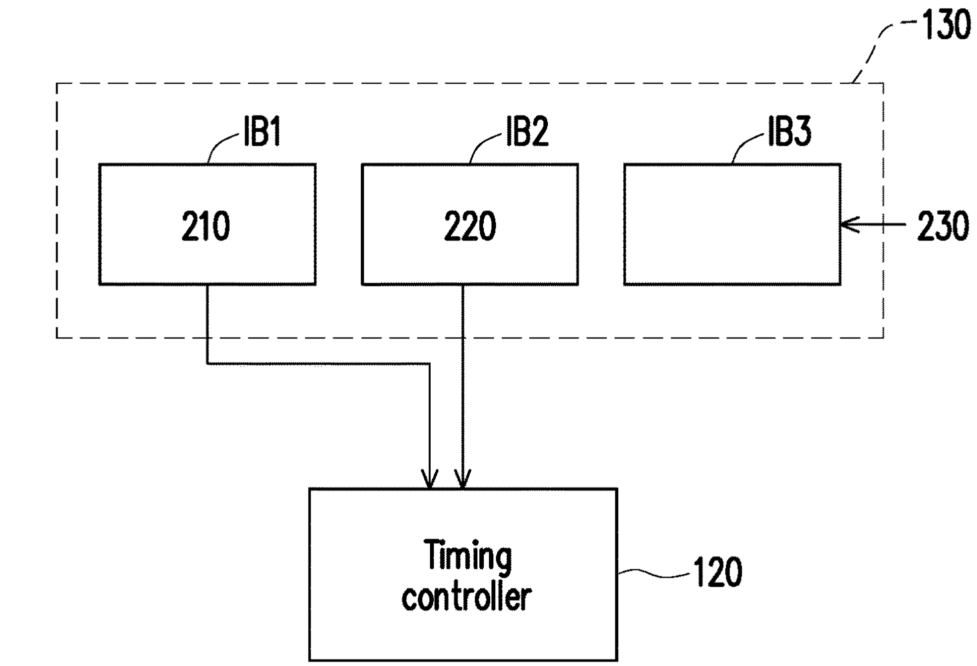
FIG. 5 and FIG. 6 are schematic diagrams showing that a timing controller reads image signals from a buffer apparatus at different timings according to another embodiment of the disclosure.
Figure 6:
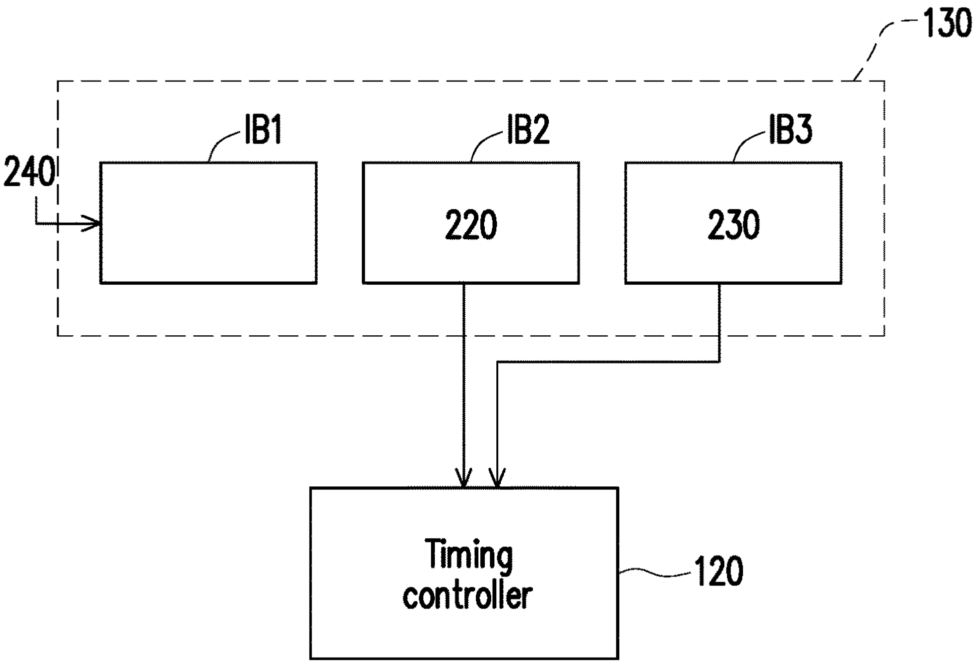

FIG. 5 and FIG. 6 are schematic diagrams showing that a timing controller reads image signals from a buffer apparatus at different timings according to another embodiment of the disclosure. In the embodiments of FIG. 5 and FIG. 6, the buffer apparatus 130 includes a third image buffer IB3 in addition to the first image buffer IB1 and the second image buffer IB2. The third image buffer IB3 is also coupled to the timing controller 120 and configured to temporarily store an image signal. The timing controller 120 may select one of the first image buffer IB1, the second image buffer IB2 and the third image buffer IB3 in turn to temporarily store an image signal of a next image, and correspondingly select the image signals stored in the other two of the first image buffer IB1, the second image buffer IB2 and the third image buffer IB3 as the current image signal and the previous image signal.

In FIG. 5, the bistable display device 100 displays an image signal 210 at present. The image signal 210 is temporarily stored in the first image buffer IB1. The bistable display device 100 then intends to sequentially display an image signal 220 and an image signal 230. The next image signal 220 to be displayed has been temporarily pre-stored in the second image buffer IB2. The timing controller 120 reads the image signal 210 and the image signal 220 from the first image buffer IB1 and the second image buffer IB2 respectively. At the moment, the image signal 210 is determined as the previous image signal, and the image signal 220 is determined as the current image signal. The timing controller 120 generates a pixel signal PS to the source driver 110 according to the current image signal (the image signal 220) and the previous image signal (the image signal 210), and drives the display panel 101 to display the image signal 220 correspondingly at the second timing t1. Besides, the third image buffer IB3 may load a next (the third timing t2) image signal 230 to be displayed in advance.

Then, at the second timing t1, the bistable display device 100 displays the image signal 220, and the second image buffer IB2 continues to temporarily store the image signal 220. The image signal 230 has been stored in the third image buffer IB3. The timing controller 120 changes the reading path to read the image signal 220 and the image signal 230 from the second image buffer IB2 and the third image buffer IB3 respectively. The timing controller 120 takes the image signal 220 as a new previous image signal and the image signal 230 as a new current image signal. The timing controller 120 generates a pixel signal PS according to the current image signal (the image signal 230) and the previous image signal (the image signal 220), and thus drives the display panel 101 to correspondingly display the image signal 230 at the third timing t2. If, next, the bistable display device 100 is to display an image signal 240 at the fourth timing t3, the first image buffer IB1 may load the image signal 240 to be displayed at the next timing. The rest can be done in the same manner.

In short, the present embodiment increases the image updating speed of the bistable display device 100 by shortening the delay time with three image buffers IB1 to IB3. The three image buffers IB1 to IB3 may receive the image signals of different timings in a fixed order, and the timing controller 120 may determine whether the data stored in the image buffers IB1 to IB3 are the previous image signals or the current image signals according to the order of the received image signals. Two of the three image buffers IB1 to IB3 are configured to temporarily store the previous image signal and the current image signal, and the third one of the image buffers may be configured to receive the image signal of the next image, so as to optimize a pipeline design. If the bistable display device 100 is to continue to maintain the current image, the third one of the image buffers may be in the idle state till a new image signal needs to be received.

It should be added that the display data DATA received by the driving circuit 102 in FIG. 1 include the image signals (such as the foregoing image signals 210 to 240) and corresponding pixel actuation location information. The pixel actuation location information records driving location information about these pixels P, for example, records those pixels P needing to change colours or gray scales or records the order of the pixels P to be displayed, but not limited thereto. For example, if the bit value of the pixel actuation location information of a certain pixel P is "1", it is indicated that the driving circuit 102 may update the state of the pixel P, and on the contrary, if the bit value of the corresponding pixel actuation location information is "0", it is indicated that this pixel P may maintain its original state. The pixel actuation location information also may be a two-bit value, e.g.: "00", "01", "10" and "11". The disclosure does not limit the number of bits of the pixel actuation location information and corresponding state setting methods.

In the embodiments of FIGS. 3 to 6, the first image buffer IB1, the second image buffer IB2, and even the third image buffer IB3 may respectively store the image signals of the display data DATA at different timings, but do not need to store the corresponding pixel actuation location information. Specifically, the first image buffer IB1 may store only the image signal 210, the second image buffer IB2 may store only the image signal 220, and the third image buffer IB3 may store only the image signal 230. Therefore, the bandwidth can be saved, and the memory capacity required by the buffer apparatus 130 can be reduced.

Figure 7:
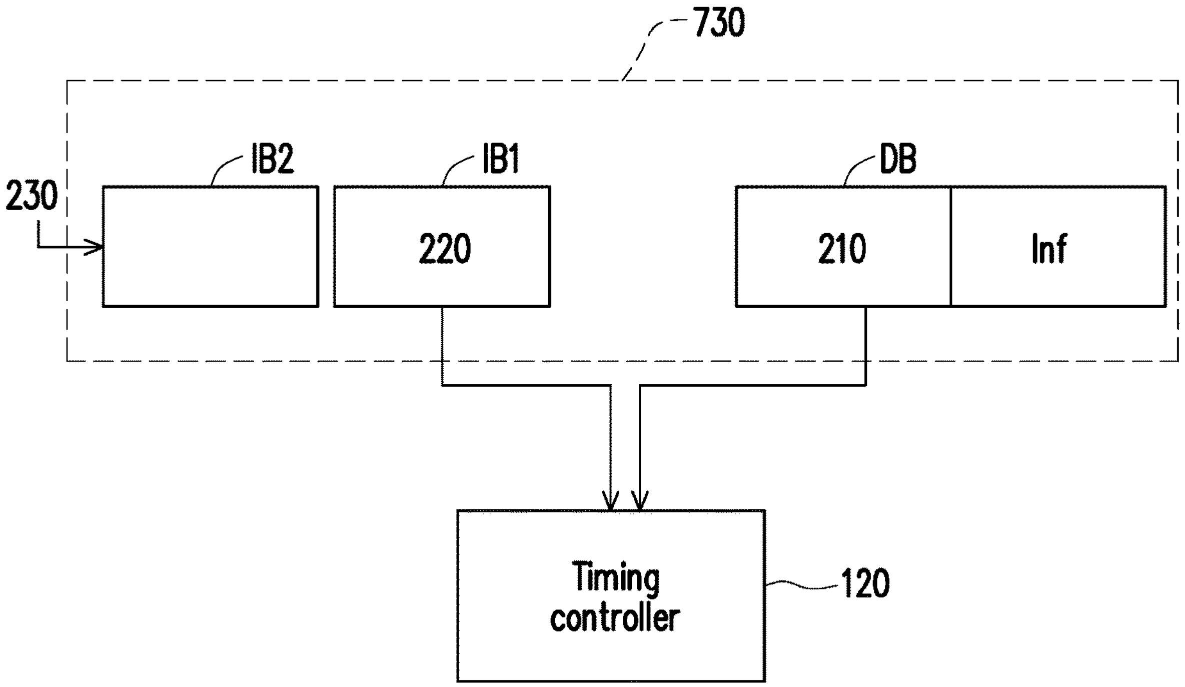
FIG. 7 and FIG. 8 are schematic diagrams showing that a timing controller reads image signals from a buffer apparatus at different timings according to another embodiment of the disclosure.
Figure 8:
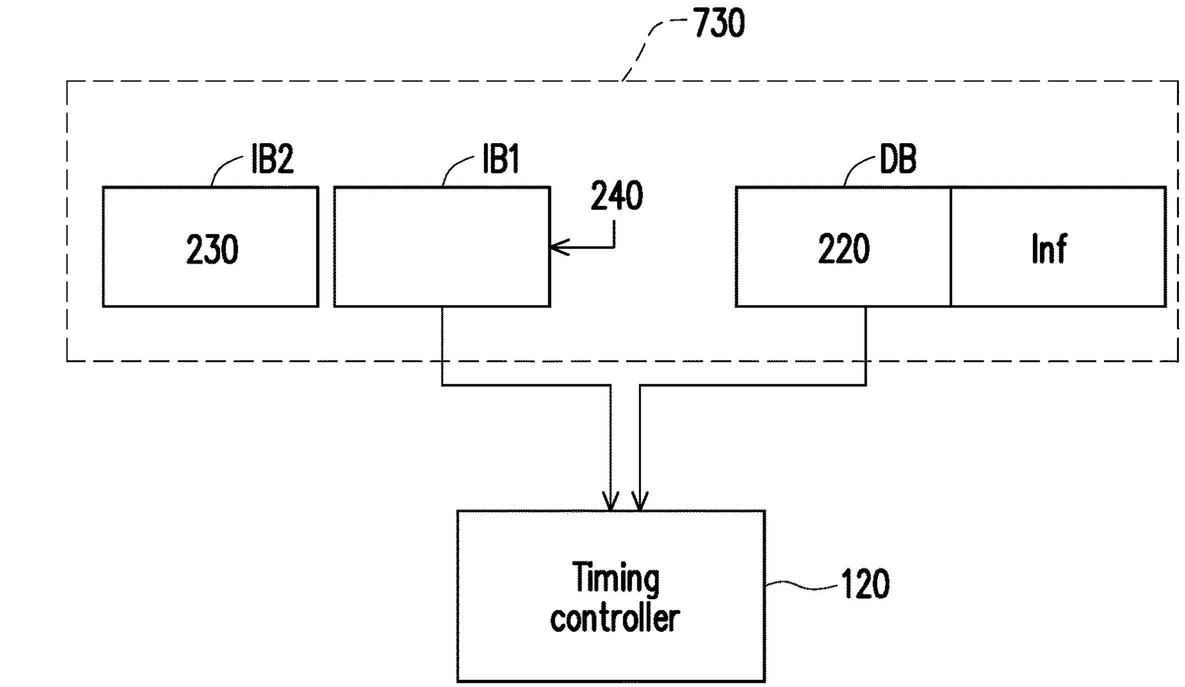

FIG. 7 and FIG. 8 are schematic diagrams showing that a timing controller reads image signals from a buffer apparatus at different timings according to another embodiment of the disclosure. Referring to FIG. 7 and FIG. 8 in combination with FIG. 2, in the present embodiment, a buffer apparatus 730 may replace the buffer apparatus 130 of the bistable display device 100. The buffer apparatus 730 is similar to the buffer apparatus 130 in structure, but the buffer apparatus 730 includes, in addition to at least one image buffer (including the first image buffer IB1 and the second image buffer IB2 herein), a display image buffer DB configured to temporarily store a previous image signal. The timing controller 120 is coupled to the source driver 110, the first image buffer IB1, the second image buffer IB2 and the display image buffer DB. In the present embodiment, the current image signal is temporarily stored in one of the first image buffer IB1 and the second image buffer IB2 in turn, and the other one of the first image signal IB1 and the second image signal IB2 may be configured to temporarily store an image signal of a next image.

In FIG. 7, the bistable display device 100 displays the image signal 210 of the first timing t0 at present, and the image signal 210 is stored in the display image buffer DB. A difference from the foregoing image buffers IB1 to IB3 is that the display image buffer DB also stores corresponding pixel actuation location information Inf. The bistable display device 100 is to display the image signal 220 at the second timing t1, and the image signal 220 is temporarily stored in one (the first image buffer IB1 herein) of the first image buffer IB1 and the second image buffer IB2.

The timing controller 120 regularly reads the previous image signal (the image signal 210 at the moment) from the display image buffer DB, and reads the current image signal in the first image buffer IB1. It should be particularly noted that in the present embodiment, the timing controller 120 may perform the look-up mechanism according to the image signal 210 and the image signal 220 in the process of generating the pixel signal PS, and also may generate a pixel signal PS according to the pixel actuation location information Inf of the display image buffer DB. Since the pixel actuation location information Inf has driving information that records the pixel P of each location, the timing controller 120 may determine a display order of the corresponding pixels P or whether to continue the driving according to the pixel actuation location information Inf. Therefore, the driving circuit 102 of the present embodiment may implement a regional driving technique according to the pixel actuation location information Inf. For example, only partial pixels P are updated.

If the bistable display device 100 is to continue to change the display image, the second image buffer IB2 may receive the image signal 230 to be displayed at the next timing (the third timing t2), and on the contrary, the second image buffer IB2 may be in the idle state.

After the bistable display device 100 displays the image signal 220, the timing controller 120 may copy the image signal 220 temporarily stored in the first image buffer IB1 to the display image buffer DB to update the previous image signal.

At the third timing t2, the timing controller 120 reads the previous image signal (the image signal 220 at the moment) from the display image buffer DB, but reads the image signal 230 from the second image buffer IB2 instead. That is, the timing controller 120 may alternately select to receive the current image signal from the first image buffer IB1 and the second image buffer IB2.

Similarly, after the bistable display device 100 displays the image signal 230, the timing controller 120 may copy the image signal 230 from the second image buffer IB2 to the display image buffer DB serving as an updated previous image signal. The first image buffer IB1 that originally stores the image signal 210 also may receive the image signal 240 of the next timing or return to the idle state.

Those skilled in the art can obtain sufficient teachings or suggestions according to the above implementation descriptions to understand the subsequent display operation flow of the bistable display device 100, and the descriptions thereof are omitted below.

It should be particularly noted that the bistable display device 100 of the present embodiment still omits the step of copying the current image signal to a specific buffer before displaying an image, and directly reads the current image signal from the image buffer, so the page updating time may still be less than 1 millisecond, which greatly reduces the display image updating delay. Meanwhile, the pixel actuation location information Inf in the display image buffer DB needs to be updated in the later stage of the driving process of the display panel 101, so that the effect of reducing the occupied bandwidth of the buffer apparatus 130 is still achieved compared to the prior art.

Based on the above, the bistable display device and the driving circuit of the embodiments of the disclosure omit the step of copying the current image signal to display an image mainly by a mode of directly reading the current image signal from the image buffer, so that the bistable display device and the driving circuit of the embodiments of the disclosure can reduce the display image updating delay and achieve a fast page change effect.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A bistable display device, comprising:

a display panel; and a driving circuit, configured to receive display data and drive the display panel, wherein the display data comprise image signals and corresponding pixel actuation location information, wherein the driving circuit comprises:

a source driver, coupled to the display panel to drive the display panel according to a pixel signal;

a first image buffer and a second image buffer;

a timing controller, coupled to the first image buffer, the second image buffer, and the source driver, wherein the timing controller alternately selects a first image signal temporarily stored in the first image buffer and a second image signal temporarily stored in the second image buffer as a current image signal and a previous image signal and performs a look-up mechanism according to the current image signal and the previous image signal to generate the pixel signal; and a third image buffer, configured to temporarily store a third image signal and coupled to the timing controller, wherein the first image buffer and the second image buffer respectively store the image signals of the display data on different timings as the first image signal and the second image signal, but do not store the corresponding pixel actuation location information, wherein the timing controller selects one of the first image buffer, the second image buffer, and the third image buffer in turn to temporarily store an image signal of a next image, and correspondingly selects the other two of the first image signal, the second image signal, and the third image signal as the current image signal and the previous image signal.

2. The bistable display device according to claim 1, wherein the first image buffer, the second image buffer, and the third image buffer respectively store the image signals of the display data on different timings as the first image signal, the second image signal, and the third image signal, but do not store the corresponding pixel actuation location information.

3. A bistable display device, comprising:

a display panel; and a driving circuit, configured to receive display data and drive the display panel, wherein the display data comprise image signals and corresponding pixel actuation location information, wherein the driving circuit comprises:

a source driver, coupled to the display panel to drive the display panel according to a pixel signal;

a display image buffer, configured to temporarily store a previous image signal;

a first image buffer and a second image buffer;

a timing controller, coupled to the source driver, the first image buffer, the second image buffer, and the display image buffer, wherein a current image signal is temporarily stored in one of the first image buffer and the second image buffer in turn, and the timing controller reads the current image signal from the first image buffer or the second image buffer to perform a look-up mechanism according to the current image signal and the previous image signal to generate the pixel signal; and a third image buffer, configured to temporarily store a third image signal and coupled to the timing controller, wherein the display image buffer stores the image signal at a first timing and the pixel actuation location information, one of the first image buffer and the second image buffer stores the image signal at a second timing, and the other one of the first image buffer and the second image buffer stores the image signal at a third timing, but the first image buffer and the second image buffer do not store the pixel actuation location information, wherein the timing controller selects one of the first image buffer, the second image buffer, and the third image buffer in turn to temporarily store an image signal of a next image, and correspondingly selects the other two of the first image signal, the second image signal, and the third image signal as the current image signal and the previous image signal.

4. The bistable display device according to claim 3, wherein an image signal of a next image is temporarily stored in the other one of the first image buffer and the second image buffer.

5. The bistable display device according to claim 3, wherein after the pixel signal is generated, the timing controller copies the current image signal temporarily stored in one of the first image buffer and the second image buffer to the display image buffer to update the previous image signal.

6. The bistable display device according to claim 3, wherein the first timing is earlier than the second timing, and the second timing is earlier than the third timing.

7. The bistable display device according to claim 3, wherein data volume stored in the first image buffer and the second image buffer is less than that stored in the display image buffer.

8. A driving circuit, configured to receive display data and drive a display panel, the driving circuit comprising:

a source driver, coupled to the display panel to drive the display panel according to a pixel signal;

a first image buffer and a second image buffer; and a timing controller, coupled to the first image buffer, the second image buffer, and the source driver, wherein the timing controller alternately selects a first image signal temporarily stored in the first image buffer and a second image signal temporarily stored in the second image buffer as a current image signal and a previous image signal and performs a look-up mechanism according to the current image signal and the previous image signal to generate the pixel signal; and a third image buffer, configured to temporarily store a third image signal and coupled to the timing controller, wherein the display data comprise image signals and corresponding pixel actuation location information, the first image buffer and the second image buffer respectively store the image signals of the display data on different timings as the first image signal and the second image signal, but do not store the corresponding pixel actuation location information, wherein the timing controller selects one of the first image buffer, the second image buffer, and the third image buffer in turn to temporarily store an image signal of a next image, and correspondingly selects the other two of the first image signal, the second image signal, and the third image signal as the current image signal and the previous image signal.

9. A driving circuit, configured to receive display data and drive a display panel, the driving circuit comprising:

a source driver, coupled to the display panel to drive the display panel according to a pixel signal;

a display image buffer, configured to temporarily store a previous image signal;

a first image buffer and a second image buffer;

a timing controller, coupled to the source driver, the first image buffer, the second image buffer, and the display image buffer, wherein the timing controller selects one of the first image buffer and the second image buffer to temporarily store an image signal of a next image in turn, reads the other one of the first image signal and the second image signal as a current image signal, and performs a look-up mechanism according to the current image signal and the previous image signal read from the display image buffer to generate the pixel signal; and a third image buffer, configured to temporarily store a third image signal and coupled to the timing controller, wherein the display data comprise image signals and corresponding pixel actuation location information, wherein the display image buffer stores the image signal at the first timing and the pixel actuation location information, one of the first image buffer and the second image buffer stores the image signal at the second timing, and the other one of the first image buffer and the second image buffer stores the image signal at the third timing, but the first image buffer and the second image buffer do not store the pixel actuation location information.

* * * * *